United States Patent
Kroll

(10) Patent No.: US 6,370,234 B1
(45) Date of Patent: Apr. 9, 2002

(54) PUBLIC SERVICE ANSWERING POINT WITH AUTOMATIC TRIAGE CAPABILITY

(75) Inventor: Mark W. Kroll, Orono, MN (US)

(73) Assignee: Kroll Family Trust, Simi Valley, CA (US)

(*) Notice: Subject to any disclaimer, the term of this patent is extended or adjusted under 35 U.S.C. 154(b) by 0 days.

(21) Appl. No.: 09/098,315

(22) Filed: Jun. 16, 1998

(51) Int. Cl.⁷ .............................................. H04M 11/04

(52) U.S. Cl. ............................ 379/45; 379/49; 379/47; 379/265.01

(58) Field of Search ........................... 379/37, 45, 309, 379/265, 266, 39–42, 47, 48, 52, 58.1, 67, 201, 279, 49; 455/404, 433, 440, 456, 457, 512, 527

(56) References Cited

U.S. PATENT DOCUMENTS

| | | | |
|---|---|---|---|
| 3,694,579 A | * 9/1972 | McMurray | 379/49 |
| 4,052,569 A | 10/1977 | Pirnie | |
| 4,706,689 A | * 11/1987 | Man | 600/302 |
| 4,716,407 A | * 12/1987 | Borras et al. | 340/2.4 |
| 4,757,529 A | * 7/1988 | Glapa et al. | 379/266.05 |
| 4,922,514 A | * 5/1990 | Bergeron et al. | 379/29.01 |
| 4,939,746 A | * 7/1990 | Childress et al. | 455/509 |
| 4,953,204 A | * 8/1990 | Cuschleg, Jr. | 379/266.5 |

(List continued on next page.)

OTHER PUBLICATIONS

FCC–94–102, Jul. 26, 1996, FCC Report and Order on Enhanced 911 Emergency Calling Systems, All pp.*
FCC–94–102 Update, Report WT–97–43 Wireless Telecommunications Action, Dec. 1, 1997.*
Antonucci and Bryant, "FCC Orders Better Safety Benefits Cell Phones Service Providers Must Identity Number on 911 Calls",634DIALOG08665071, San Jose Mercury News, Jun. 13, 1996, Morn. Ed. Frt. Sect, p. 1A.*
Bishop, Dzubeck, Finley, Edwards, Guyton, and Hall, "Is LNP Sacrificing Safety?", 696DIALOGTCN 00721447, Phillips Bus. Info., Intelligent Network News, vol. 10, Is. 8, Apr. 12, 2000.*
"E911 Legislation Promised in House", Communications Today, Potomac, May 13, 1998, C. Phillips Business Information Corp.*
Ackerman, "Television Cable Provides Wireless Communications", Apr. 1997, Signal AFCEA, pp 21–23.*
Adams, "FCC Looks For E–911 Progress Through Delays", Communications Today, Potomac, Sep. 12, 2000 c. Phillips Business Information Corporation.*
Ayers, "FCC Clears the Way for Major Improvements in Wireless Emergency Services", Jun. 12, 1996, File 813 Dialog 098761, CTIA PRNewswire.*
"Shared Dispatch Radio Systems Yield Prime Benefits", Apr. 24, 1998, Land Mobile Radio News vol. 52 Iss. 17, Potomac c Phillips Business Information Corporation (proquest).*
Industry Agrees 'Technology–Neutral' Approach is Needed for E911', 696Dialog00678417, Jun. 28, 1999, Mobile Communication Resort, Warren Publishing Inc.*
Nichols, "Medic Alert President Issues Statement on Relationship to Life Alert", Sep. 12, 1991, 148 DiALOG 05432812, PR Newswire, Gale Group Trade and Industry DB.*
Papazian, "A call for help", Apr. 1995, Harvard Helath Letter, vol. 20 Iss. 6, pp 1–4.*

(List continued on next page.)

*Primary Examiner*—Fan Tsang
*Assistant Examiner*—Ovidio Escalante

(57) ABSTRACT

A public service answering point system is taught that will perform a triage on incoming calls both fully automatically and with caller interaction. The system will progressively shave out redundant calls and give high priority to calls that may represent a violent crime in progress.

14 Claims, 6 Drawing Sheets

U.S. PATENT DOCUMENTS

| | | | |
|---|---|---|---|
| 5,109,399 A | | 4/1992 | Thompson |
| 5,134,652 A | * | 7/1992 | Brown et al. ................ 379/163 |
| 5,161,180 A | * | 11/1992 | Chavous ....................... 379/45 |
| 5,195,126 A | * | 3/1993 | Carrier et al. ................. 379/45 |
| 5,249,223 A | * | 9/1993 | Vanacore ............... 379/266.06 |
| 5,267,305 A | * | 11/1993 | Prohs et al. ................. 379/233 |
| 5,278,898 A | * | 1/1994 | Cambray et ak. ........ 379/266.1 |
| 5,311,569 A | | 5/1994 | Brozovich |
| RE34,677 E | * | 7/1994 | Ray et al. ...................... 379/37 |
| 5,339,351 A | * | 8/1994 | Hoskinson et al. ........... 379/45 |
| 5,343,493 A | * | 8/1994 | Karimullah ................. 375/130 |
| 5,388,147 A | * | 2/1995 | Grimes ....................... 455/404 |
| 5,444,433 A | * | 8/1995 | Gropper ..................... 340/601 |
| 5,479,482 A | | 12/1995 | Grimes |
| 5,515,421 A | * | 5/1996 | Sikand et al. ............. 379/88.21 |
| 5,542,100 A | | 7/1996 | Hatakeyama |
| 5,548,583 A | | 8/1996 | Bustamante |
| 5,563,931 A | * | 10/1996 | Bishop et al. ............... 455/404 |
| 5,574,977 A | * | 11/1996 | Joseph et al. ............... 455/450 |
| 5,598,460 A | * | 1/1997 | Tendler ...................... 455/404 |
| 5,602,901 A | * | 2/1997 | Redden et al. .............. 455/404 |
| 5,615,249 A | * | 3/1997 | Solondz ...................... 455/450 |
| 5,621,379 A | * | 4/1997 | Collins et al. .............. 340/332 |
| 5,630,209 A | * | 5/1997 | Wizgall et al. ............... 455/66 |
| 5,712,619 A | * | 1/1998 | Simkin ....................... 340/539 |
| 5,742,666 A | * | 4/1998 | Alpert ........................ 455/404 |
| 5,742,904 A | * | 4/1998 | Pinder et al. ............... 455/404 |
| 5,761,278 A | * | 6/1998 | Pickett et al. ............. 379/90.01 |
| 5,781,101 A | * | 7/1998 | Stephen et al. ........ 340/286.02 |
| 5,787,162 A | * | 7/1998 | Javitt ......................... 379/229 |
| 5,805,670 A | * | 9/1998 | Pons et al. .................... 379/45 |
| 5,815,799 A | * | 9/1998 | Barnes et al. .................. 455/15 |
| 5,835,907 A | * | 11/1998 | Newman ..................... 707/10 |
| 5,864,755 A | * | 1/1999 | King et al. .................. 455/404 |
| 5,878,115 A | * | 3/1999 | Valentine et al. ............ 455/422 |
| 5,933,080 A | * | 8/1999 | Nojima ....................... 340/539 |
| 6,009,163 A | * | 12/1999 | Nabkel et al. ......... 379/266.01 |
| 6,014,556 A | * | 1/2000 | Bhatia et al. ............... 455/404 |
| 6,038,437 A | * | 3/2000 | Zicker ........................ 455/404 |
| 6,044,146 A | * | 3/2000 | Gisby et al. ........... 379/266.02 |
| 6,058,179 A | * | 5/2000 | Shaffer et al. ......... 379/220.01 |
| 6,067,457 A | * | 5/2000 | Erickson et al. ............ 455/512 |
| 6,070,065 A | * | 5/2000 | Ambruster et al. ......... 455/404 |
| 6,073,005 A | * | 6/2000 | Raith et al. ................. 455/404 |
| 6,081,592 A | * | 6/2000 | Battle ......................... 379/309 |
| 6,084,510 A | * | 7/2000 | Lemelson et al. .......... 340/539 |
| 6,085,097 A | * | 7/2000 | Savery et al. ............... 455/456 |
| 6,087,952 A | * | 7/2000 | Prabhakaran ............ 340/693.5 |
| 6,104,784 A | * | 8/2000 | Robbins ....................... 379/45 |
| 6,112,083 A | * | 8/2000 | Sweet et al. ................ 455/426 |

OTHER PUBLICATIONS

"FCC Modifies Cost–Recovery Requirement for Wireless E911", Nov. 29, 1999, 696Dialog007051572, Mobile Communications Report, Warren Publishing inc.*

"Process Cleared to Apply to Handset–Based ALI Waivers", Jan. 19. 1999, Communications Today, Potomac, c. Phillips Business Information Corporation.*

"Much Left to do Regarding E–911 Issues, Wheeler Tells CONFAB", Aug. 26, 1998, Wireless Today, Potomac, c. Phillips Business information Corporation.*

* cited by examiner

PUBLIC SERVICE ANSWERING POINT WITH AUTOMATIC TRIAGE CAPABILITY

BACKGROUND OF THE INVENTION

The emergency phone system in United States is now a very frequently used service. For example, a 911 call is made every 1.5 seconds just from cellular phones.

Unfortunately, the system has become bogged down from misuse and also from excessive good citizenry. It is estimated that a typical freeway accident will generate two dozen 911 calls. In each case a caller is being a good citizen yet is clogging up the system so other new calls cannot get through. It is very common with an overloaded system such as that found in Los Angeles County that calls are placed on hold and many calls are simply not answered.

In one well-publicized case a gang beating took place on a beach in broad daylight and citizens calling in were placed on hold as no 911 operator could take their call.

Thus, there is a need for an automated system that will sort through emergency calls and eliminate the redundant calls so that the operators will only deal with the true emergencies as well as the minimum number of calls for a given incident needed to dispatch appropriate rescue personnel to that incident.

Brozovich, "Line-Based Public Safety Answering Point," (U.S. Pat. No. 5,311,569) teaches a basic PSAP with multiple operative stations.

Prnie, "Emergency Call Answering System," (U.S. Pat. No. 4,052,569) teaches a PSAP in which the calls are allotted on a sequential basis to the various operators.

None of these systems teach an automated triage function. None of these systems teaches an interactive approach for dealing with the 911 congestion problem. Thus, there is a need for a public service answering point system that will perform a triage on incoming calls either fully automatically or with caller interaction.

DETAILED DESCRIPTION OF THE DRAWINGS AND DESCRIPTION OF THE PREFERRED EMBODIMENT

Figure 1:
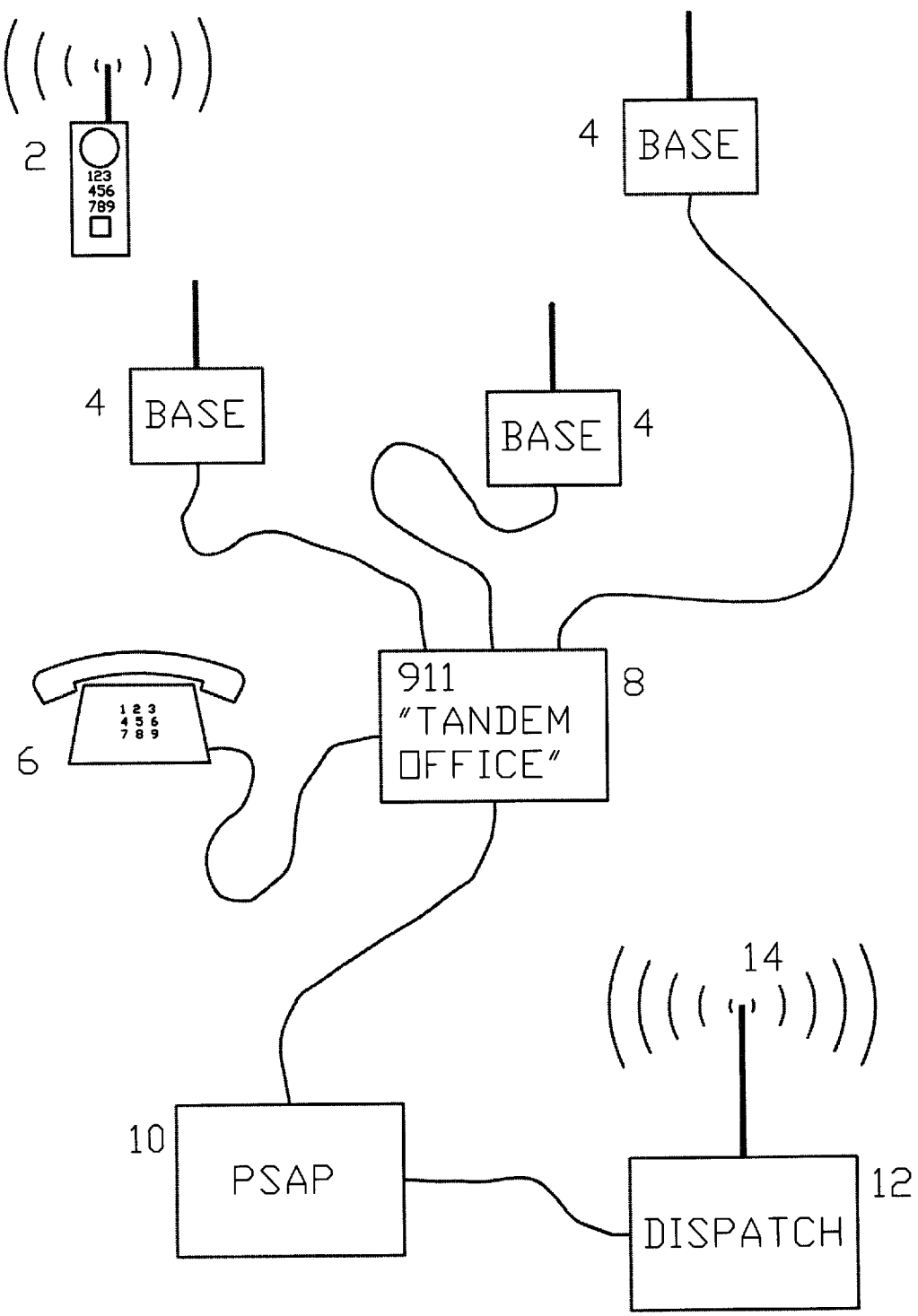
FIG. 1 shows a 911 PSAP shown in the context of an overall phone and dispatch system.

FIG. 1 shows a basic 911 PSAP system in the context of an overall phone and dispatch system. Cellular phone 2 transmits a 911 call to a base station 4. Base station 4 then transmits over a microwave or hard connection (copper wire or optic fiber) to the 911 "Tandem Office" 8. Tandem Office 8 is also connected to a conventional wired phone 6. The office 8 then transmits its call to the PSAP 10 with operator control at PSAP 10 so the call will be routed to the dispatch station 12 (for the appropriate emergency response) to be typically transmitted over antenna 14, to a radio equipped emergency vehicle.

Multiple base stations may be used to derive location information of the calling party. Such systems are taught by Hatakeyama, "Mobile Communication System," (U.S. Pat. No. 5,542,100) and Bustamante, "Wireless Telephone User Location Capability for Enhanced 911 Application," (U.S. Pat. No. 5,548,583). In the alternative, a cellular phone may be connected to a global positioning system (GPS) receiver as taught by Grimes, "Cellular Terminal for Providing Public Emergency Call Location Information," (U.S. Pat. No. 5,479,482).

Figure 1A:
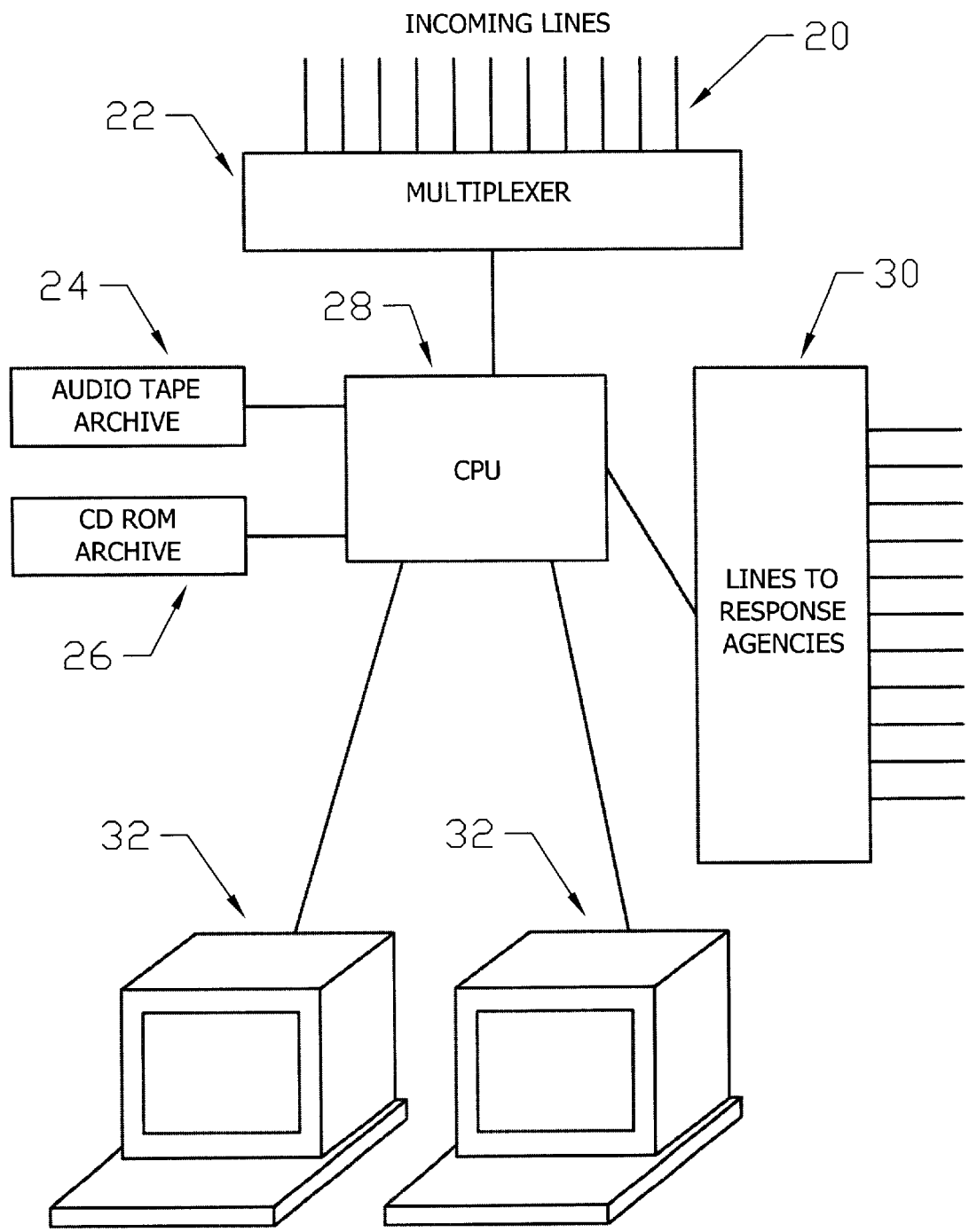
FIG. 1a teaches the PSAP of the instant invention.

FIG. 1a gives a basic structure of the instant invention. Incoming lines 20 are connected to a multiplexer 22 which feeds the audio phone signal to CPU 28. The CPU 28 is in turn connected to an audio tape archive 24 and a CD Rom archive 26. The audio tape archive continuously records everything that is said on the incoming phone lines by the calling party and the operators. The CD Rom archive stores the above information in a compressed format along with the phone number of the calling party, the base station used, and the time. This is important in case the caller hangs up and information is needed for the identity of a witness.

Several operator consoles 32 are connected to the CPU which in turn is connected to outgoing line system 30 for connection to the various response agencies.

In operation, a 911 call would come in and, based on the triage methods taught in this invention, would be assigned a location in a queue. When the call came up for answering the operator would briefly interact with the calling party and push the appropriate button to dispatch the call to the correct response agency.

Figure 2:
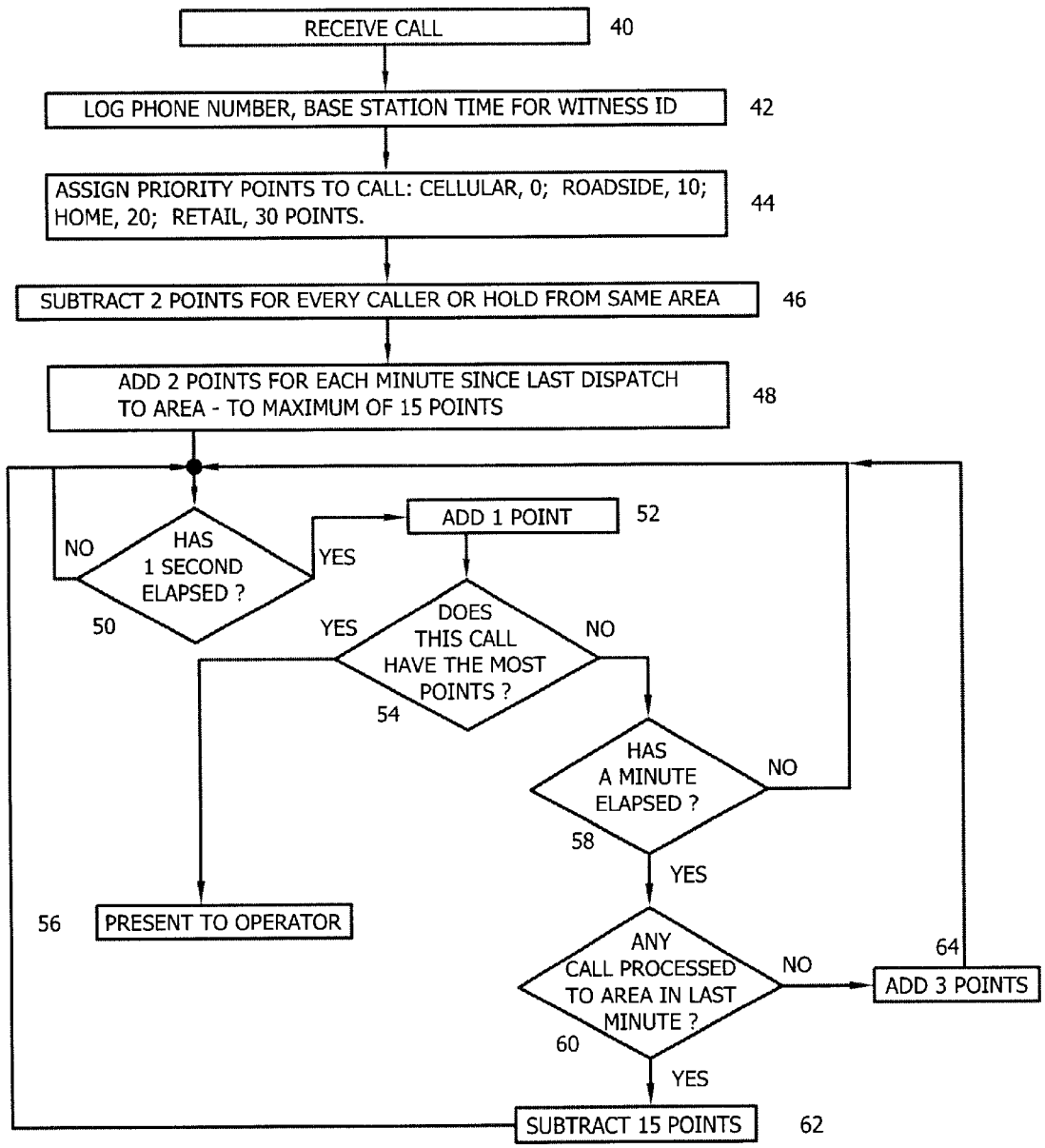
FIG. 2 shows the method of one embodiment of the preferred invention.

The method of one preferred embodiment of the instant invention is given in FIG. 2. The goal of this method is to progressively shave out redundant calls. This is necessary, for example, due to the multiplicity of cellular calls that arrive for each highway incident.

A further goal is to give high priority to calls that may represent a violent crime in progress.

The first step 40 of the method is to receive the call. Step 42 is to log the phone number, base station used (if any) and time for possible identification of a later witness in case of a hang up. Any location information would also be logged at that point. If the caller was calling from a wired phone this location information would be provided automatically through the conventional automatic location identification (ALI) system.

In step 44 priority points are assigned. A retail store receives 30 points due to the possibility of the call reflecting a customer cardiac arrest or armed robbery. A home call would receive 20 points. A call from a fixed road side station would receive 10 points as they are typically non-emergency requests for a tow truck. A cellular phone call would receive 0 points as there is usually a very high level of duplication in these calls.

In Step 46 a correction is made for possible duplicate calls. For each caller on hold from a given area 2 points is automatically subtracted. The definition of area can vary. A simple definition would be a common base station for cellular phones. Thus if there were five 911 calls coming into a single base station there is a very high likelihood that these are duplicate calls. Each caller would then receive a penalty of 2×5 or 10 points. For wired phones, a radius of 2 miles (as calculated from the ALI information) could be used. Negative numbers are allowed in this scoring system.

In Step 48 a correction is made for the possibility that there is a new incident in the area. Thus for each minute since the last dispatch to an area two points are added to each call from that area. This is limited to a maximum of 15 points. For example, if the police were dispatched to an accident seven minutes ago and a new call just came in from that area there is a high likelihood that the new call is referring to a different incident. That call thus receives 14 additional priority points.

The call is now placed into the hold queue. In Steps 50 and 52 one point per second is added for the time that a call is on hold. The presumption is that a serious caller is likely to be patient and wait as opposed to a casual caller that may hang up immediately when they find that they are on hold.

At Step 54 the system asks if this call has the most points. If it does then the call goes to Step 56 and is presented to the next operator in sequence. If the call does not have the most points then the method progresses to Step 58. Here a test is made to see if the caller has been on hold for another minute. If the caller has been on hold for another minute then the method proceeds to Step 60 and asks if any call has been processed to that area in the last minute.

If there has been no such previously processed call in the last minute then three priority points are added to the new call's score for that minute (and for each succeeding minute). The rationale for this is that the present caller is probably calling about a fresh incident since there has been no recent dispatch to the area.

If there has been a call processed within that area in the last minute then there is a high likelihood that this new call is a duplicate call and 15 points are subtracted from this caller's priority score.

Figure 3:
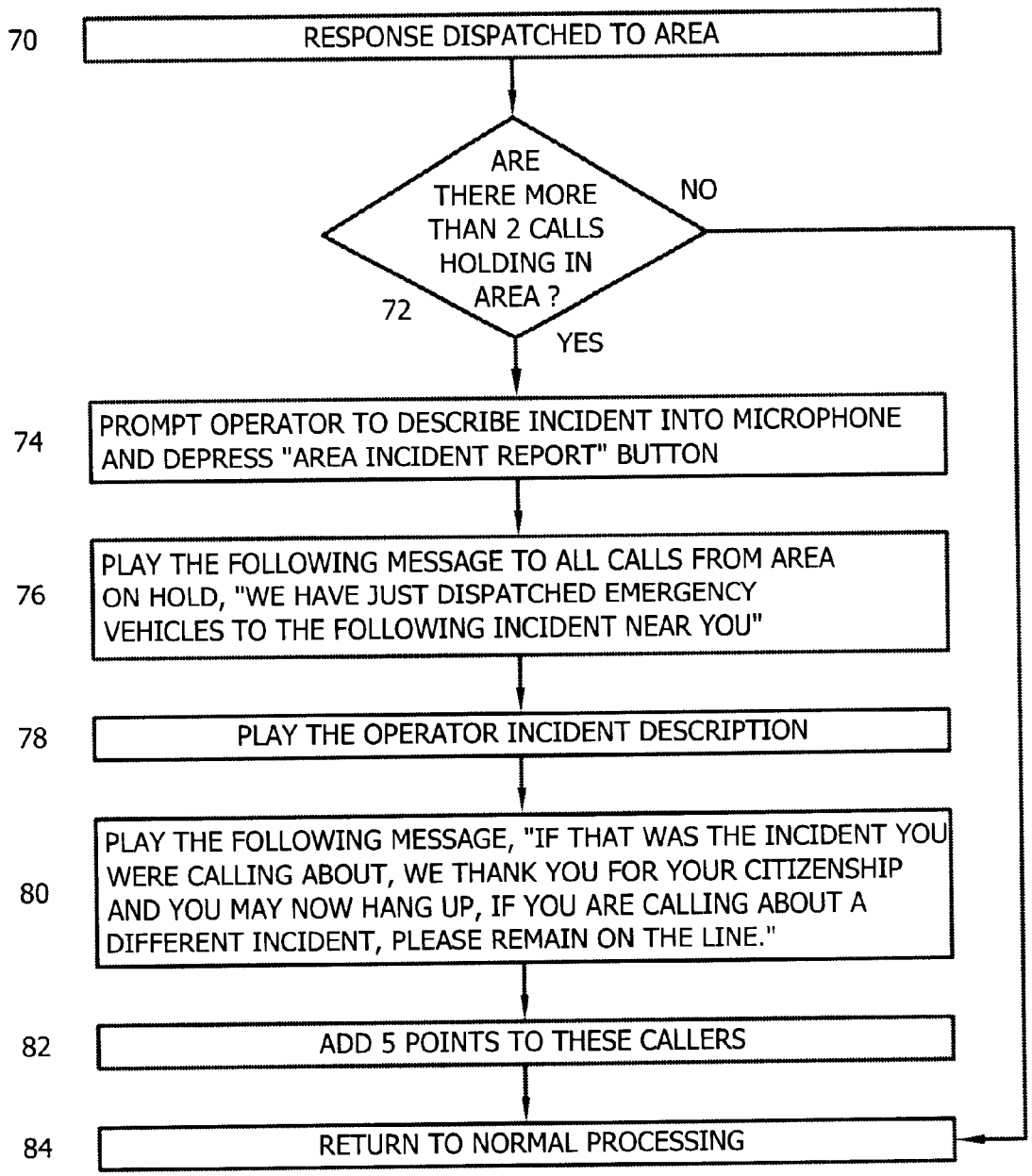
FIG. 3 shows another method of the instant invention.

FIG. 3 describes an automated interactive triage embodiment of the instant invention. This provides for an updated hold message to help the caller decide if they are indeed making a duplicate call.

At Step 70 a response is dispatched to an area. At Step 72 the system asks if there are more than two calls holding in that area of the dispatch. If there are not then the system returns to normal processing at Step 84. If there are more than two calls holding in the area then one can suspect that there is high likelihood that these are duplicate calls. At Step 74 the system prompts the operator to describe the incident into a microphone and depress the "Area Incident Report" button. This would result in a very abbreviated statement such as, "There is a roll over on Highway 101 at mile marker 93."

In Step 76 the system will play the following message to all calls on hold from that area, "We have just dispatched emergency vehicles to the following incident near you." At Step 78 the system then immediately plays the operator incident description that had been recorded just previously. I.e. it goes on to say, "There is a roll over on Highway 101 at mile marker 93."

In Step 80 the system goes on to play the following closure message, "If that was the incident you were calling about, we thank you for your citzenship and you may now hang up. If you are calling about a different incident, please remain on the line."

In Step 82 five points are added to the score for each caller who remained on hold after this message has been played. This is due to the high likelihood that these callers are referring to a new incident. The call then returns to normal processing as described in FIG. 2.

Figure 4:
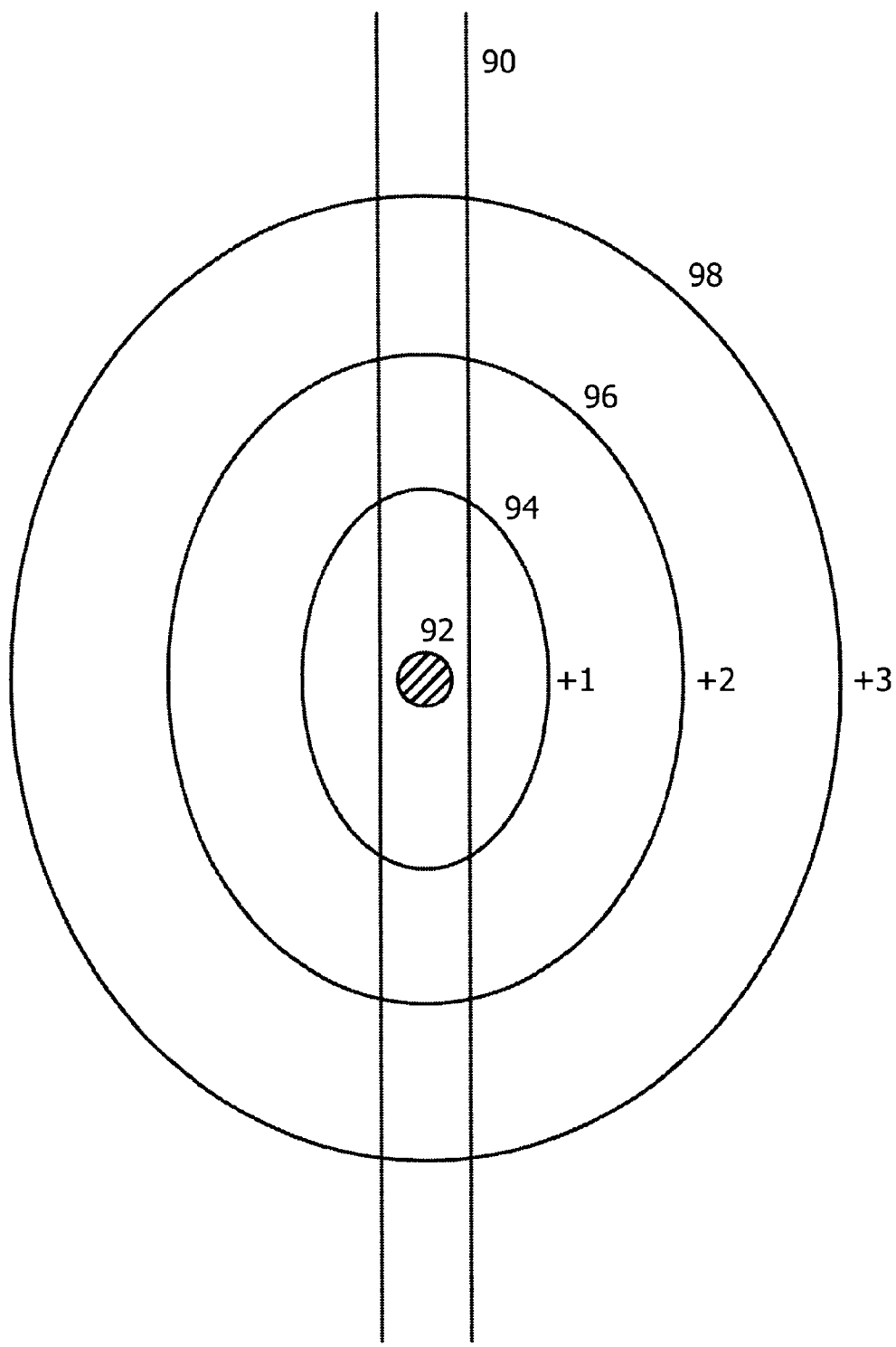
FIG. 4 shows a triage system based on calling party location with respect to the incident.

FIG. 4 describes one embodiment of the instant invention for use of sophisticated location information. As mentioned earlier, there are several ways to determine the location of a caller. For a wired line the existing ALI system works. For cellular phones one could use a GPS position transmission, the base station connected to, or various "triangulation" systems for determining a more precise location as discussed in Grimes, Hatakeyama, or Bustamente, for example.

This location information could be used to perform a more sophisticated triage on callers. For example, let's imagine that an incident occurs on Highway 90 at location 92. If a call comes in along the highway and relatively close to incident 92 there is a high likelihood that it is a duplicate call. If, however, the call comes from off of the highway or is further down the road, then there is less of a likelihood that this is a duplicate call. One way to capitalize on this information is to assign an additional priority point per mile that the call is away from the incident in the direction of the highway, but, assign two points per mile that the caller is away perpendicular to the highway.

This is due to the fact that the caller perpendicular to the highway is much less likely to have simply driven past the incident on the highway and is more likely to be reporting a new incident. Hence the elliptical scoring regions shown in FIG. 4. Outside of region 94 each caller gets an additional point of priority. Outside of region 96 each caller gets an additional two points priority. Outside of region 98 each caller gets three additional priority points.

Figure 5:
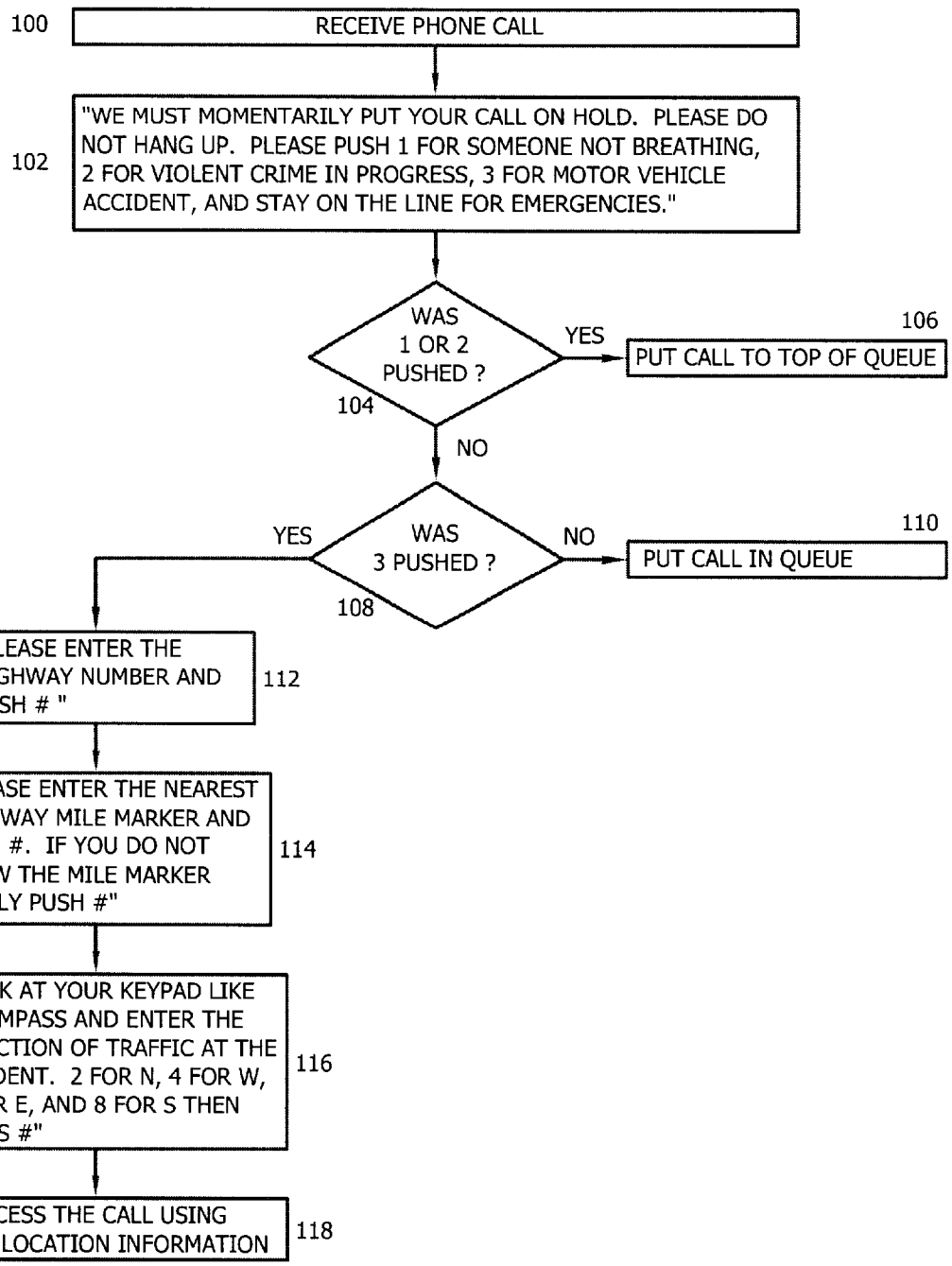
FIG. 5 shows another embodiment of the instant invention.

FIG. 5 shows another embodiment of the instant invention. This embodiment uses "voice mail" techniques to assist in the triage and location of a call.

In Step 100 the cell phone call is received. In Step 102 a message is delivered, "We must momentarily put your call on hold. Please do not hang up. Please push 1 for someone not breathing, 2 for a violent crime in progress, 3 for motor vehicle accident, and stay on the line for other emergencies."

In Step 104 the system asked was number 1 or 2 pushed. If so, this is an extreme emergency and the system goes to Step 106 to put the call to the top of the queue for response.

If neither of those buttons were pushed, then the system goes to Step 108 and asks whether button number 3 pushed. If it was not, then the call goes into the normal queue in Step 110. If the button was pushed, then the system goes to Step 112 and prompts, "Please enter the highway number and push #." The system then goes to Step 114 after receiving a response and prompts, "Please enter the nearest mile marker and push #. If you do not know the mile marker, simply push #." The system will then go on to Step 116 and prompt, "Look at your keypad like a compass and enter the direction of traffic at the incident. Enter 2 for North, 4 for West, 6 for East, and 8 for South. Then push #." Finally, the system will, in Step 118, continue to process the call using the location information according to the other methods taught in this invention. It then properly places the call in the queue.

Clearly many variations of the basic invention can be imagined and are intended to be covered by this patent. One could envision a multitude of different frame techniques and scoring systems and a multitude of different voice interactions with the calling party without departing from the spirit of this invention.

I claim:

1. A public safety answering point comprising:

phone call receiving circuitry;

a central processing unit connected to said circuitry;

operator consoles connected to the central processing unit;

the central processing unit executing a stored program to select the highest priority call for presentation to an operator console wherein the stored program assigns a priority on the basis of at least two factors; and said central processing unit determines a time period since a last emergency vehicle was dispatched to a call area and uses said time period to determine that the call is a new incident based on said time being greater than a predetermined period of time thus increases the priority of the call.

2. The public safety answering point of claim 1 in which the call location is used as one of the at least two factors to assign priority.

3. The public safety answering point of claim 1 in which the probability of a call having a duplicate message is used to assign priority.

4. The public safety answering point of claim 1 in which the priority is increased if the caller is away from the roadway of an already reported incident.

5. The public safety answering point of claim 1 in which a caller is prompted to enter location information with a telephone keypad.

6. A method for processing emergency calls in a public safety answering point comprising the steps of:

connecting to a plurality of calls;

assigning a priority score to each call; and answering the call with the highest priority score wherein the priority is assigned on the basis of at least two factors; and determining a time period since a last emergency vehicle was dispatched to a call area and using said time period to determine that the call is a new incident based on said time being greater than a predetermined period of time thus increasing the priority score of the call.

7. The method of claim 6 in which the caller location is used to calculate the priority score as one of the at least two factors.

8. The method of claim 6 in which a probability of the call having a duplicate message is used to calculate the priority score.

9. The method of claim 6 in which the priority score is increased if the caller is away from the roadway of an already reported incident.

10. The method of claim 6 in which a caller is prompted to enter location information through a telephone keypad.

11. The method of claim 6 in which caller information is automatically stored even if a caller hangs up.

12. The method of claim 6 in which the time a caller has been on hold is used as one of the at least two factors to calculate the priority score.

13. The method of claim 6 in which a cellular phone call receives a different priority score than a private wired phone call.

14. A method of processing emergency cell phone calls in a public safety answering point comprising the steps of:

connecting a call;

prompting an entry of highway location data via a telephone keypad; and using the data by a central processing unit to prioritize the call for processing; and determining by said central processing unit a time period since a last emergency vehicle was dispatched to a call area and using said time period to determine that the call is a new incident based on said time being greater than a predetermined period of time and thus increasing the priority score of the call.

* * * * *